US006909451B1

(12) United States Patent
Latypov et al.

(10) Patent No.: US 6,909,451 B1
(45) Date of Patent: Jun. 21, 2005

(54) METHOD FOR GENERATING VIDEO PROGRAMS, VARIANTS, AND SYSTEM FOR REALIZING THIS METHOD

(76) Inventors: Nurakhmed Nurislamovich Latypov, Russia, Moscow, 5 Voikovsky proezd, d. 10, kv. 31, Moscow (RU), 125171; Nurulla Nurislamovich Latypov, Russia, Moscow, 5 Voikovsky proezd, d. 10, kv. 31, Moscow (RU), 125171

( * ) Notice: Subject to any disclaimer, the term of this patent is extended or adjusted under 35 U.S.C. 154(b) by 0 days.

(21) Appl. No.: 09/786,514

(22) PCT Filed: Sep. 2, 1999

(86) PCT No.: PCT/RU99/00319

§ 371 (c)(1),
(2), (4) Date: Mar. 1, 2001

(87) PCT Pub. No.: WO00/14958

PCT Pub. Date: Mar. 16, 2000

(30) Foreign Application Priority Data

Sep. 4, 1998 (RU) .......................................... 98116685

(51) Int. Cl.[7] .......................... H04N 5/272; H04N 7/14
(52) U.S. Cl. ................................ 348/14.07; 348/14.08
(58) Field of Search .............................. 348/586, 14.07, 348/14.08, 14.09, 587, 589, 590, 591, 592, 593, 563, 564; H04N 5/272, 7/14

(56) References Cited

U.S. PATENT DOCUMENTS

| | | | | |
|---|---|---|---|---|
| 4,965,819 A | * | 10/1990 | Kannes | 348/14.07 |
| 5,639,151 A | * | 6/1997 | McNelley et al. | 353/98 |
| 6,052,648 A | * | 4/2000 | Burfeind et al. | 702/3 |
| 6,086,380 A | * | 7/2000 | Chu et al. | 434/307 A |
| 6,400,374 B2 | * | 6/2002 | Lanier | 345/630 |

FOREIGN PATENT DOCUMENTS

| | | |
|---|---|---|
| EP | 0 581 591 A1 | 2/1994 |
| EP | 0 602 913 A2 | 6/1994 |
| RU | 2011312 C1 | 4/1994 |
| RU | 2096925 C1 | 11/1997 |
| RU | 2108005 C1 | 3/1998 |
| WO | 89/02203 | 3/1989 |
| WO | 97/17803 | 5/1997 |

OTHER PUBLICATIONS

International Search Report prepared in connection with PCT/RU99/00319 with a Date of Mailing of Dec. 23, 1999 (Russian as Prepared, and English Translation).

* cited by examiner

Primary Examiner—Michael H. Lee
(74) Attorney, Agent, or Firm—Jenkens & Gilchrist, P.C.

(57) ABSTRACT

The invention relates to television, interactive television, user interfaces, video conferences and may be used in the creation of video programs with interactive interaction between participants of video programs and objects generated by a computer program. The technical result is enhancement of the reliability and quality of the display to viewers of images, formed by a computer, and the reaction of participants of a video program to a change of the images. A participant 2 of a video program is shot by a video camera 1, wherein an image, formed by a means 3 (computer), is simultaneously displayed to the participant 2 on the line of shooting with the video camera. At least an image of objects of a forward plan, which is formed by the means 3, is combined in the unit for combining images, these objects being put on the video image of the participant, obtained by the video camera 2, in such a manner, that a viewer sees the participant 2, who is watching the objects of the forward plan and interacting with them with the aid of a means 6.

20 Claims, 2 Drawing Sheets

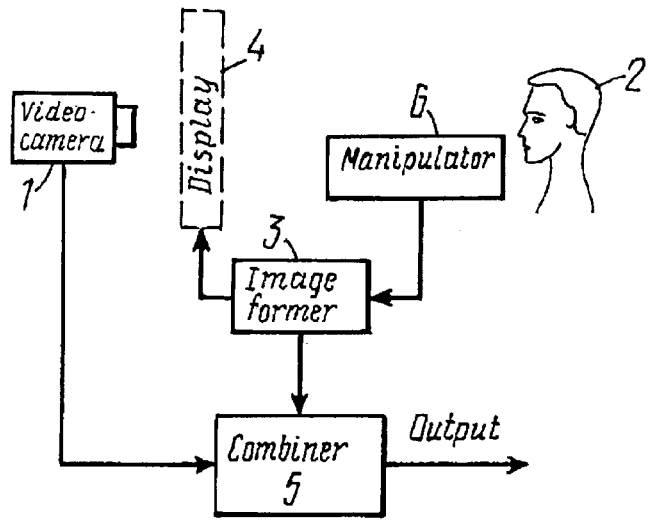
FIG. 1
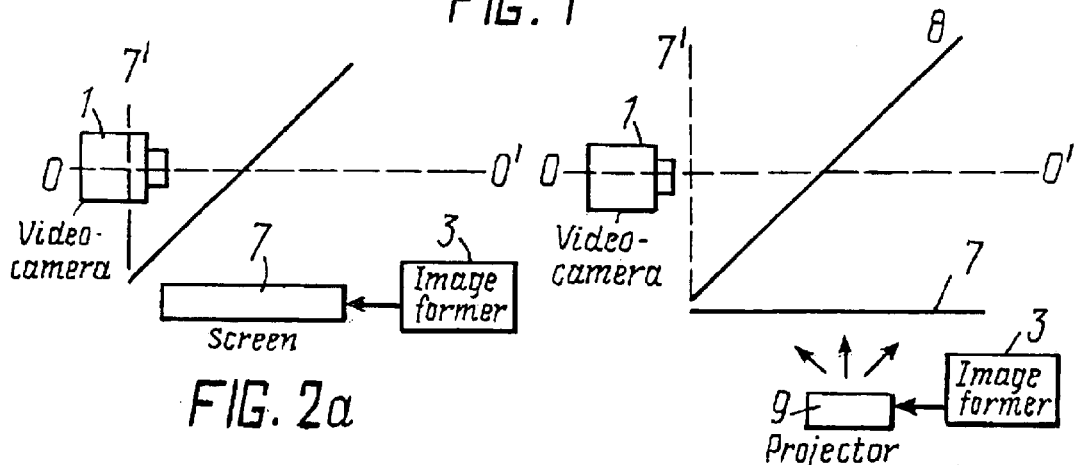
FIG. 2a
FIG. 2b
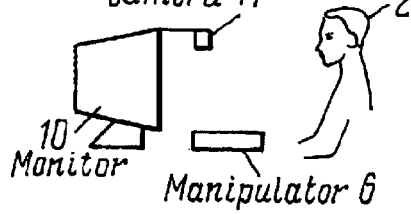
FIG. 2c
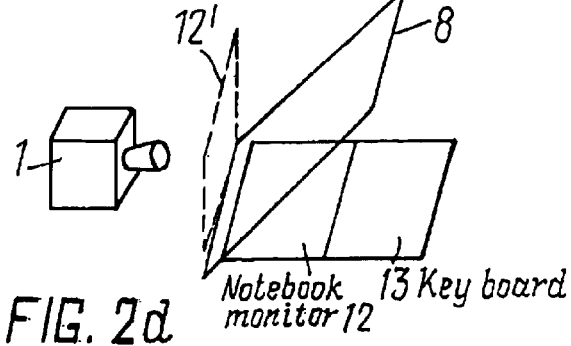
FIG. 2d

US 6,909,451 B1

METHOD FOR GENERATING VIDEO PROGRAMS, VARIANTS, AND SYSTEM FOR REALIZING THIS METHOD

FIELD OF THE INVENTION

The present invention relates to television, including interactive television, user interfaces, video conferences, telecommunication networks and, more concretely, to a method and system for creating video programs, including game show-programs with interactive interaction between actors and objects generated by a computer program.

BACKGROUND ART

A method and a system for creating video programs are known, wherein images alternate and are shown in separate windows (window interface, picture in picture). In order to do this a participant of a video program is shot with a video camera, an image is formed with the aid of computer with according software and the formed image is displayed to the participant. The video image and the computer image are displayed to viewers sequentially or simultaneously in different windows of one screen, wherein the image in one of the windows does not obviously depend on what is in the other.

Also widely known is a method for creating video programs, in which a user-participant of a video program and an image generated by a computer are shot in the process of interaction of the user with the computer. Wherein, different variants of shooting the user are used, which differ by the selection of the angle of approach and the montage. When a shot is taken from the direction of the computer, the viewers may observe the emotions of the user-participant of the video program, the user's actions, but the computer screen and the reaction of computer programs objects to the user's actions are not seen. If the shooting is conducted with a show of the computer screen, viewers may additionally observe only the back of the user's head, and do not see his emotions, mimics, reactions and gestures. The most widely spread variant is shooting from the side when the screen is partially seen, the obtained image on the screen as a rule being of low quality, and whereby the user is seen in profile. In other variants of shooting, post-shooting montage is used, when several pictures shot at different angles of approach are combined on a divided screen. In the case of specialized television programs which are based on the interaction of a user with objects of a computer program (games, problems, tests, teaching), this method is not sufficiently effective. The described approaches do not ensure the display of the objects of the user, the program and the process of their interaction on one screen.

A system is known for creating video programs, comprising a video camera coupled to a unit for combining images, a computer with a unit for generating images, also coupled to the unit for combining images, which has an output for a video signal suitable for recording or broadcasting (see the magazine "Seti," Jun. 1998, publisher "Otkrytye Sistemi," pp. 52–56). The known system makes it possible to create video images in accordance with the methods described above. This system does not provide for the formation of an image showing the use interacting with objects of tile computer program with which the user interacts in the shooting process.

A method is known for creating video programs for remotely spaced one from another participants (video conference mode), wherein video cameras are used to form a video image of users of computers which are interconnected by means of a telecommunication network and use, as a rule, one and the same software or work with one application (see the magazine "LAN," Jun. 1998, v. 4, publisher "Otkrytye Sistemi," pp. 81–86). A video image of a participant of the video conference is sent through the network and is output in a separate window (frame in frame), superimposed on the main window in one of the corners. Such a method for remote interaction with the possibility of seeing and hearing a partner makes it possible to jointly solve different problems. A drawback of this method is the visual inconsistency of the user-partner's reaction displayed in the separate window with the image on the main screen and with changes of that image. The partner of the video conference here acts as an external adviser, and not as a co-participant of the actions which are occurring on the main screen. Wherein, if the changes take place dynamically and several objects are shown simultaneously, it is not possible to identify the partner's reaction to a change of separate objects displayed on the main screen.

DISCLOSURE OF THE INVENTION

The object of the instant invention is to create methods and a system for shooting video programs of the type described above, which provide the possibility of shooting a participant of a video program in the process of the participant's interaction with displayed objects of a computer program in such a manner that viewers could watch on a screen the participant's reaction to changes in the computer program, the participant's mimics, gestures and simultaneously watch the results of operation of the computer program on the same screen.

The technical result being achieved is enhancement of the quality of the created video programs by increasing the reliability and quality of displaying to the viewers images formed by the computer and the reaction of the actor-participant to a change of these images. Furthermore, the quality of the created images is enhanced by the possibility which the invention provides for displaying images formed by the computer of objects of the computer programs with which a participant of the video program interacts in the space between the participant and the viewer, as a result of which the effect of viewers' participation in the on rolling performance is created, the impressiveness and attractiveness of the video program are enhanced, which promotes an increase of the viewers' interest in video programs created in this manner, wherein the video programs may be used for a study of the process of interaction of a participant with objects generated by the computer.

The indicated technical result is achieved in that in a method for creating video programs, which is based on video shooting and forming computer images, wherein an image is formed by a computer, which includes an image of objects in the foreground and a background image, shooting a participant of the video program is carried out with a video camera and a corresponding video image is obtained, an output video signal is formed with use of the video image of the participant of the video program and the image formed by the computer, in accordance with the invention at least objects of the foreground of the image formed by the computer are displayed to the participant of the video program, shooting the participant of the video program is carried out in the process of displaying at least objects of the foreground of the image formed by the computer to the participant of the video program with an angle of approach of the shooting providing the possibility of reproducing in the obtained video image the reaction of the participant of the video program to the displayed objects of the computer program, the image formed by the computer is combined with the video image of the participant of the video program by superimposing an image of at least the objects of the foreground on the video image of the participant, and the combined image is used for subsequent display to the user.

Wherein it is preferable that the shooting of the participant of the video program be carried out on a chromakey background, and when the image of the objects of the foreground, which are formed by the computer, is combined with the video image of the participant of the video program, the chromakey background is replaced with the aforementioned background image or with any other image, wherewith the participant of the video program is provided with the possibility of interacting with the displayed objects formed by the computer, and of changing the image of the aforesaid objects.

It is also preferable, that at least the video image of a participant of a video program, which is shot by a video camera in a studio, and data necessary for forming an image with a computer arc transmitted via a telecommunication network to a user device, an image is formed in the user device on the basis of data received from the studio, this image including an image of the objects of the foreground and a background image, the video image of the participant of the video program and the image formed by the user device are combined by superimposing the image of the objects of the foreground onto the video image of the participant, and displaying the combined image to the user.

Wherein, an input of control commands used to form the image in the user device may be carried out in the user device, the control commands are transmitted through the telecommunication network into the studio and are used to form an image by the computer.

Shooting a user with a video camera, transmitting a video image of the user through a telecommunication network into a studio, combining the video image of the user received in the studio with objects of the foreground by superimposing an image of these objects on the video image of the user, and displaying the combined image to a participant of the video program, which combined image may be used for display to other users, may additionally be carried out.

The indicated technical result is also achieved in that a system for creating video programs, combining shooting with a video camera and forming images with a computer, primarily television programs, the system comprising a video camera for shooting a participant of a video program and a means for forming an image including objects of the foreground and a background image, the video camera and the means being disposed in a studio, in accordance with the invention comprises a means for displaying at least objects of the foreground to the participant, the means for displaying being connected to the means for forming an image, and a means for combining images, a first input of which is connected to an output of the video camera, a second input to an output of the means for forming an image, wherein the aforesaid means for combining images is made with the possibility of superimposing an image of objects of the foreground on a video image of the participant. It is preferable that the clothes of the participant (participants) be of a neutral color or of colors which do not coincide with those of the objects, then the objects will not blend with the background (with the participant).

Wherewith the means for displaying is preferably made so that the image displayed to the participant intersects the line of shooting. In particular, the aforesaid means for displaying preferably comprises a screen, coupled to a means for forming images and disposed outside the limits of the field of view of a video camera, and a semitransparent mirror, optically conjugated with the aforesaid screen and disposed on the line of shooting the participant with the video camera, at an angle to the aforesaid line to provide the possibility of forming a reflected image displayed to the participant in a plane substantially perpendicular to the line of shooting.

Furthermore, the system preferably comprises a means for interactive interaction of the participant with objects of the displayed image, the means being coupled to the means for forming an image, and made, for example, in the form of a means for determining the position and orientation of the participant.

In one of the embodiments the system additionally comprises a channel of a telecommunication network, a connection unit coupled by two-way communication to the channel of the telecommunication network, to a means for forming an image and to a means for combining images, and at least one user device comprising a user means for forming an image of the objects in the foreground and a background image, a user connection unit coupled by two-way communication to the channel of the telecommunication network and to the user means for forming an image, a user means for combining images of the foreground with a video image of a participant of a video program sent over a channel of the telecommunication network and made with the possibility of superimposing the image of the objects in the foreground on the video image of a participant of the video program and a user means for displaying the combined image, wherein, a first input of the user means for combining the images is connected to an output of the user connection unit, a second input is connected to an output of the means for forming images, and an output is connected to an input of the unit for displaying a combined image.

In the indicated embodiment the system preferably also comprises a user control unit, an output of which is connected to a corresponding input of the user connection unit, and/or a user control command processing unit disposed in the studio and connected by two-way communication to the connection unit and to the means for forming the image.

The indicated technical result is also provided in that in a method for creating video programs in a video conference mode based on video shooting and forming images with a computer, wherein an image is formed by computers for each of at least two spatially separated participants of a video program, the image including an image of the objects of the foreground and a background image, wherein the aforesaid computers are linked through a telecommunication network, at least the image of the foreground objects, formed by a computer, is displayed to each of the participants of the video program, the possibility of interacting with the displayed objects and changing the displayed objects is provided to each of the participants of the video program, shooting each of at least two participants of the video program is carried out with a video camera, a video image of each participant is sent through the telecommunication network and displayed to the other participant, in accordance with the invention the shooting of each participant of the video program is carried out in the process of the participant's interaction with at least the objects of the foreground of the image formed by a computer, the image of the foreground objects which are displayed to a particular participant is combined for each of the participants with a video image received of another participant of the video program by superimposing the aforesaid image of the foreground objects on the aforesaid received video image of the participant of the video program and a combined video image is displayed to each of the participants of the video program, wherein the background, on which a participant of the video program is shot with a video camera, is cleaned from the received video image and replaced with a background image formed by a computer or by any other image.

Furthermore, the technical result indicated above is achieved in that in a method for creating video programs for registering, the reaction of a user to a presented image for studying and optimizing interfaces of computer programs and editing video films, wherein an image is formed, the formed image is displayed to the user, the user is shot with a video camera and a corresponding video image is obtained, an output video signal is formed with use of the video image of the user and the formed image for subsequent analysis, in accordance with the invention, the shooting of the user is carried out in the process of displaying the formed image to the user with an angle of approach of the shooting which provides the possibility of reproducing in the obtained video image a reaction of the user to the image displayed to the user, transparent zones are created in the image being formed, the formed image is combined with the video image of the user by superimposing the formed image with the transparent zones on the video image of the user.

Wherein, the image formed by the computer comprises an image of the objects and a background image, the background image being formed transparent when combined with the video image of the user.

Furthermore, the user is provided with the possibility of interacting with the objects of the displayed image formed by the computer.

It is useful to additionally register data of the psycho-physiological condition of a user in the process of displaying the formed image to the user, wherein the indications of the registered data are combined with the images of the video program.

BRIEF DESCRIPTION OF THE DRAWINGS

The invention is explained with examples of embodiment illustrated with drawings.

FIG. 1 shows a block diagram of a system for creating video programs, in accordance with the invention.

FIG. 2 shows embodiments of realizing the means for displaying an image formed by a computer to a participant of a video program.

EMBODIMENTS OF THE INVENTION

Figure 3:
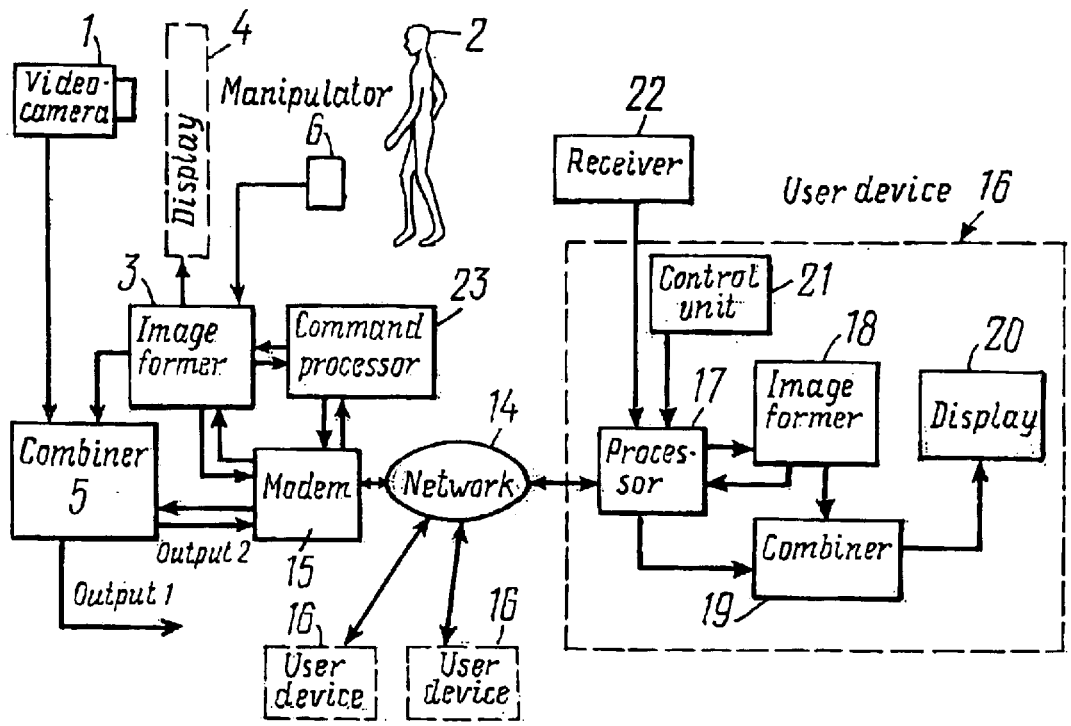
FIG. 3 shows a block diagram of a system for creating video programs, which provides the possibility for interactive interaction of a user with a participant of a video program and/or with objects generated by a computer.

A system for creating video programs, primarily TV programs, shown in FIG. 1, comprises a video camera 1, serving to shoot a participant 2 of a video program, a means 3 for forming an image to be displayed to the participant 2 with the aid of a means 4 for displaying, a unit 5 for combining images, one input of which is connected to an output of the video camera 1, another input—to an output of the means 3 for forming an image, and an output of the unit 5 for combining images is an output of a finally formed video signal which may be used for transmission to user terminals (not shown in FIG. 1). An input of the means 3 for forming an image is connected to an output of a means 6 for interaction of a participant 2 of a video program with objects formed by the means 3 (computer). All possible manipulators and sensors—mouse, joystick, keyboard, transparent sensor screen, virtual gloves, game consoles, sensors of body part movements, microphone for receiving vocal commands, may be used as the means 6 for interaction.

Embodiments of realization of the means 4 for displaying an image formed by the means 3 are shown in FIG. 2 (a)–(d). FIG. 2 (a) shows a screen 7, for example, a monitor screen on which images formed by the means 3 are displayed. The screen 7 is set in such a manner that it does not obstruct the shooting of a participant, i.e. is outside the field of view of the video camera. A glass plate 8 (or a semitransparent mirror), forming a false (or real) image 7' is mounted on the shooting line O–O', passing through the video camera 1 and the participant 2, at an angle to the line O–O', preferably at an angle of about 90 degrees to the line O–O', in accordance with how the display of a standard display means is oriented.

An embodiment of the means 4 for displaying is shown in FIG. 2 (b) for the cases of shooting the participant at full height (view from above). In this embodiment the means 4 for displaying comprises a screen 7, mounted outside the field of view of the video camera 1, a semitransparent mirror 8, mounted on the shooting line O–O', and a projector 9, coupled to a means 3 for forming an image and optically conjugated with the screen 7.

Embodiments are shown in FIGS. 2 (c) and (d) for realization of the means 4 for displaying for outside-studio use. In the variant according to FIG. 2 (c), the means 4 for displaying is a standard monitor 10, on which a small-size video camera 11 is mounted, put forward of a monitor 10 screen and providing a video conference mode. The binocularity of a user's sight ensures that the video camera 11 will not close any of the objects of the image simultaneously for both eyes of the user. In the variant according to FIG. 2 (d) a notebook monitor 12, positioned in the same plane as its keyboard 13, serves as the display means 4. The image from the monitor 12 is displayed to the user through the plane 8, thus creating a false image 12'.

The system for creating, video programs, which is shown in FIG. 3, provides for the transmission of created television programs through telecommunication networks and provides the possibility for interactive interaction between user-viewers and, the objects of the video program and/or the participant. In the system according to FIG. 3, a second output of the unit 5 for combining the images is coupled to the telecommunication network 14 through a corresponding connection unit 15, for example, modem. The means 3 for forming an image is coupled by two-way communication to the connection unit 15. The telecommunication network 14 is connected to a user device 16 which comprises a corresponding connection unit, the functions of which in the variant under consideration are performed by a processor device 17, outputs of which being connected to an input of a user means 18 for forming an image and to one of the inputs of a user unit 19 for combining images. An output of the forming means 18 is connected to another input of the unit 19 for combining images, an output of which is connected to an input of a unit 20 for display of a combined image. The user device 16 also comprises a control unit 21 connected to the input of the processor device 17 to input the user's control commands, which may be sent through the telecommunication network 14 and the connection unit 15 into the studio.

In the embodiment of the claimed system, which provides for transmission of a signal of a combined image from the studio through the air, through a cable or through other channels, the system comprises a corresponding receiving device with an antenna 22.

In this case a combined image and data on the parameters of an image formed by a computer in the studio come through the air to the user. Using this data at the user device 16, the user may interact, using the control unit 21, with objects meant to be controlled by the user. Wherein, a return signal from the user, containing control commands, may be sent to the studio through the telecommunication network 14.

In the embodiment of the system, which is presented in FIG. 3, the system also comprises a unit 23 for processing the user's control commands, which unit is coupled by two-way communication to the connection unit 15 and to the means 3 for forming images. Users' control commands may be used to obtain individual information from the users: to control objects generated with the aid of computer software, to determine users' ratings, to distribute opinions of groups of users, their preferences, individual evaluation of users' actions, organization of a competition between an actor and one or several distant users.

In accordance with information concerning the users, individualized special information may be sent to the user devices: tasks, advertisements, evaluation, proposals, results of processing generalized information from all of the users. Such individual information may be displayed for each user in separate windows of an image common to all.

Figure 4:
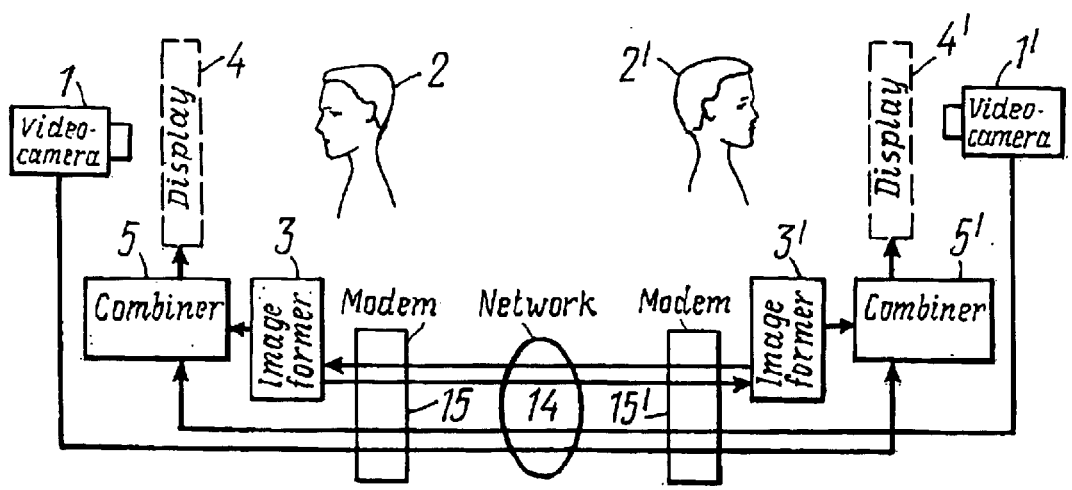
FIG. 4 shows a block diagram of a system for creating video programs in a video conference mode.

The system for creating video programs in a video conference mode, shown in FIG. 4, provides the possibility for several partners to see each other during interaction with objects of computer programs, which are displayed to them on a background of a video image of the partner. The system comprises video cameras 1, 1' for shooting participants 2, 2', respectively, means 3, 3' for forming an image with a computer, means 4, 4' for displaying video images received from the network 14 and formed images to participants of a video conference, units 5, 5' for combining video images of participants of the video conference and the formed images, and units 15, 15' for connecting to the network 14, which are coupled to the units 5, 5' for combining and to the means 3, 3' for forming an image.

The system for creating video programs, made in accordance with the invention, operates in the following manner.

A participant 2, who is shot by at least one television camera 1, is placed in a television studio as shown in FIG. 1. As a rule, the participant is shot full face, sitting at a table, as hosts of television programs are usually shot, or in full height, providing a participant with the possibility of moving in a limited space. Wherein, simultaneously with the shooting, images are displayed to a participant of the video program which are formed by the means 3, for example, a computer game. The video image of the participant, obtained by the video camera, and an image from the means 3 for forming are combined in the unit 5 for combining images. The images formed by the means 3 are actually the result of operations carried out in a computer by a corresponding program and, as a rule, consists of two parts (two layers): a background image and objects. The background image and the objects, in turn, may themselves also consist of several layers. With the aid of a corresponding program unit, any layer may be separately output. The image of the objects is separated from the background image and in the unit 5 for combining is superimposed on the video image of the participant, which is formed by the video camera. Both the image of the objects and the background image made be made semitransparent, alternating pixels of the image and transparent pixels. When such an image is superimposed on the video image of a user, the latter will be seen by viewers through the image formed by the computer. If the images are combined by television analogue mixers, then those parts of the image being formed by the computer, which should be transparent, are filled with a chromakey color so as to use the real-projection method during superimposition. In that case the chromakey color is removed, and the place which it occupied in the image becomes transparent. Combining the images is carried out in such a manner that a viewer sees a participant watching the objects formed by the means 3. When the images are combined any of the layers of the images may be made semitransparent, i.e. the degree of its transparency may be changed from zero to one during the solution of certain problems. Such an adjustment of the degree of transparency of one of the layers may be accomplished in the studio by a director or in a user device by a user. Wherewith, a viewer, watching the combined image, gets the impression of participation. It seems to the viewer that the objects formed by the computer and displayed on the screen are between the viewer and the participant of the video program. So that the means 4 for displaying would not interfere with the shooting of the participant and would not fall within the field of view of the video camera, the means 4 is made as shown in FIGS. 2 (a)–(d). The images formed by the means 3, which is outside the field of view of the video camera, are displayed to the participant, who is a user of the means 4 for displaying, in such a manner that the images would not block the television camera from the participant being shot.

As shown in FIG. 2 (a), at least an image of the objects formed by the means 3 is displayed on the screen 7. The glass plate (or semitransparent mirror) 8 mounted above the screen 7 (at the side or above the screen) provides for forming an image 7', which is a reflection of the screen 7, transverse to the axis O–O' passing along the line of shooting a participant (or participants) of the video program. In this case, a participant 2 watches the image-reflection 7' of the image from the screen 7. Wherein, the Applicant's gaze will be simultaneously directed to the screen 7' and towards the video camera. If the image formed by the computer on the screen 7 is temporarily turned off, the participant may concentrate his gaze on the lens of the television camera as in traditional shooting. Taking into account the dimensions of the screen 7, the distance from the plane on which the image 7' is formed to the participant 2, the distance from the participant 2 to the video camera 1 and its parameters, and the laws of perspectivity during the creation of images, it is possible to ensure exact coincidence of the participant's reaction to the image 7' in the combined image for television viewers (for example, directing his gaze to an object or moving a hand over the sensor screen after the object being displayed). An image containing a caption is connected in such a manner that the captions on the combined image, displayed to the viewers and displayed to the participant in the plane of forming the image 7', would look natural.

When a participant is shot in full height (FIG. 2 [b]—view from above) an image on a large translucent screen 7 is formed with the aid of the projector 9, which is connected to the means 3 for forming an image. A participant 2 watches the image 7', all image from the screen 7 reflected from the semitransparent mirror 8.

If the creation of video images is meant for one or a few users, the video conference mode may be realized, wherein users do not only see each other but may control the objects which are displayed to them and which they observe between themselves and a partner. In accordance with FIG. 2 (c), the video conference mode is realized with the use of a computer and a video camera, wherein software provides for the display of a partner's image on a background of objects generated by the means for forming images (by a computer), not in a separate window. Partners, participating in the video conference, see one and the same objects in front of them, each from its own side, and they may jointly discuss these objects or introduce changes therein. Such a variant of realizing video conferences is especially effective in the case of playing computer games with a partner or as a computer variant of realization of "table" games. It will seem to the partners that they are playing at one table, they will see and hear each other, see each other's reaction to corresponding moves, even though at that moment the partners will be separated by thousands of kilometers. In outside-the-studio conditions, it is also easy to realize the variant described above with reflection of an image from the semitransparent mirror 8 with use of a "notebook" type computer (FIG. 2 [d]).

The embodiment of the system providing for interactive interaction between a viewer with objects generated by a computer aid/or with a participant (FIG. 3) operates in the following manner. A signal, containing a video image of a participant and data necessary to form an image with a user's computer, is sent from the studio through the telecommunication network 14 to a user device 16. A user means 18 for forming forms an image of the objects. Then, using the user unit 19 for combining, the video image of a participant of a video program, which image is sent over the network, and the image of objects, which is formed by the means 18, are combined, putting the image of the objects over the video image of the participant. Then the combined image is displayed to a viewer-user with the aid of the means 20 for displaying. If the viewer-user uses a control unit 21, then the means 18 for forming forms an image of the objects, taking into account the data received from the studio and the control commands from the unit 21. Wherewith, the control commands are sent to the studio and are processed in the studio by the unit 23. Different variants for providing a viewer with interactive interaction with objects formed by a computer are possible. For example, back coupling to a studio through a telecommunication network may be used. Without use of such back coupling, the viewer will receive the combined image and data on the image formed by the computer through, for example, the air or by cable. The means necessary in the majority of cases for synchronizing, digitizing, archiving, compressing images and for reverse operations are not shown in the drawings.

The system for creating video programs in a video conference mode (FIG. 4) provides users remotely spaced one from another with the possibility to observe objects formed by a computer, as if between each other. In order to do this the video image of one user 2, shot by a camera 1, is sent through a telecommunication network 14 to be combined with objects formed by a means 3' of another user 2', after which the objects formed by the means 3' are superimposed on the video image of the user 2 in the unit 5' for combining the images. The same operations are simultaneously carried out for the other user 2'. Wherein, the image formed by the computer is made transparent over some areas and is superimposed on the video image of the other user. Each user will thus see the objects formed by the computer between himself and the partner of the video conference. In In a preferable embodiment of the invention, a video camera is used in the studio, the video camera shootings through a semitransparent mirror (glass plate) 8 which is mounted at an angle of 45 degrees to the shooting line O–O' and reflects to the participant the screen of a monitor on which a computer game, which the participant is playing during the shooting, is displayed. Wherewith, the shooting of the participant may be carried out on a chromakey background, and the display of the objects of the computer game and the participant—on a background formed by that same program which forms the objects of the computer program, or on any other background which may be changed at any moment of the shooting. Combining the objects formed by the computer with the video image of the user is carried out in a real-time mode. Wherein, the objects formed by the computer are superimposed on the video image of the participant. And if the participant is shot on a chromakey background, then, in turn, the video image of the participant (with an already transparent background) is superimposed on the background image.

Traditional computer and video games may be used as the software used in the shooting. In order to do this, small changes, providing for the separate output of an image of the objects and a background image, should be introduced into those games.

It should be noted that the concept "video programs," which is used in the instant specification, should be understood to be wider than programs for standard television broadcasting. Video programs, created by the method according to the instant invention may be inserted into computer networks and transmitted through computer networks, including with the presentation of the possibility for interactive interaction with a "viewer." The claimed method may be used to organize video conferences, create educational video programs and video programs for studying the reaction of users.

Use of the claimed method is especially useful for making a study and optimization of user interfaces of computer programs so that the programs would be intuitively understood and convenient for users. It is possible to track and time all the actions of a user while working with a computer with a program, a certain interface, and a complete record of his actions. The user himself cannot control and consciously describe all his actions. Quite often these actions are carried out subconsciously. Many reactions are not controlled by the user himself, for example, small movements of his eyes and reflex reactions. Special sensors may be used to register the area toward which the user's gaze is directed, and this area will be displayed on a corresponding place in the image of the objects. A person's eye may see clearly and sharply only a very small area which is in the center of the angle of view, the so-called Foll zone. The image as a whole seems to a person to be sharp due to unconscious micromovements of the eye. Wherein, a person's sight especially keenly reacts to chances in the image being observed, constantly sending information thereon into the brain and receiving in response control commands at the subconscious level. In the video programs created in accordance with the present invention, the majority of a user's reactions, conscious and unconscious, will be registered. Further improvement of computer programs, taking the results of studies of video materials into account, will aid to increase the volume of the sale of these programs, to increase their competitiveness in the market, as a result of selection of optimum functions and user interface. Optimization of the interface and the structure of a program in turn will save the time and simplify the work done by a final user, increase the productivity of his labor. Further advantage during an examination of video protocols (video programs) of the user's work with a computer may be provided by use of sensors of a user's eye movements, emotional reaction etc., and a corresponding input of their indications to the video program.

INDUSTRIAL APPLICABILITY

The invention corresponding to the claimed method may be used for medical and professional testing and training of users. In the case of specialists in psychophysiological testing, the possibility is provided for registering not only the actions of those being tested, but also to study the reaction of users, including subconscious reaction recorded in the form of a video program. The reactions of users on a background of stimulator images displayed to them and data on the dynamic monitoring of the state of users being tested are recorded in the video program. Wherewith, monitoring of the psychophysiological condition of the user being tested may be carried out with different types of sensors: a sensor of the emotional condition ("lie detector," polygraph), blood pressure, pulse, and they may be displayed on the same screen. Such a method may be more widely used, not only when a user works with a computer, but also during a study of a viewer's reaction while the viewer is watching a movie or an animated cartoon. For this, the image of a video film is reproduced instead of an image generated by a computer. The combined results of a study of the reactions of a representative selection of viewers to a certain video film in accordance with the invention, actually provide an objective evaluation of the video film itself on the basis of objective psychophysiological data. A study of the reactions of viewers in control groups prior to releasing the film for wide demonstration makes it possible to obtain data for analysis of the reaction of the mass of viewers and to more exactly chose the best variants for development of the plot and for editing to obtain predictable results. Achievement of the necessary indications, in accordance with the results of the studies, will help to improve the drawing power of films and to obtain the necessary reaction of the mass viewer. Where necessary, information transmitting the reaction of a viewer to a separate concrete frame may be obtained, this making it possible to track the movement of a viewer's gaze over the plane of a displayed image.

What is claimed is:

1. A method for creating video programs using video shooting and forming computer images, comprising the steps of:
   generating an image by a computer, said image including an image of objects in a foreground and a background image;
   displaying to a participant of the video program at least said image of objects in the foreground;
   shooting the participant of the video program by means of a video camera;
   wherein said shooting is carried out during said step of displaying at least said image of objects in the foreground of the image to produce an obtained video image;
   wherein said shooting is carried out with an aspect angle for providing a possibility of reproducing in the obtained video image a response of the participant of the video program to the displayed objects of the computer program; and
   combining said image formed by the computer with the obtained video image of the participant of the video program by superimposing at least said image of objects in the foreground on the obtained video image of the participant to produce an output video signal of a combined image.

2. The method according to claim 1, wherein
   said step of shooting comprises shooting the participant of the video program on a chromakey background;
   said step of combining comprises replacing the chromakey background with said background image; and
   said step of combining comprises replacing the chromakey background with any other image.

3. The method according to claim 1, further comprising:
   providing a possibility to the participant of the video program to interact with the displayed objects generated by the computer and to change the image of said objects.

4. The method according to claim 1, further comprising:
   transmitting from a studio at least said video image of the participant of the video program, and data necessary for generating said image by said computer via a telecommunication network to a user device;
   generating an image in the user device based on said data transmitted from the studio;
   wherein said image generated in said user device including an image of the objects of a foreground and a background image;
   combining the video image of the participant of the video program and the image formed by the user device by superimposing the image of the objects of the foreground onto the video image of the participant; and
   displaying the combined image to a user.

5. The method according to claim 4, further comprising:
   inputting control commands to the user device;
   generating an image in the user device using said control commands;
   transmitting said control commands through the telecommunication network to the studio; and
   generating an image with said computer using said control commands.

6. The method according to claim 5, further comprising:
   shooting the user by said video camera to obtain a video image of the user;
   transmitting said video image of said user through said telecommunication network to the studio;
   receiving said video image of said user at said studio;
   combining the video image of the user received in the studio with objects of the foreground of the image formed by the computer in the studio by superimposing an image of said objects of the foreground on the video image of the user to obtain a combined image; and
   displaying the combined image to the participant of the video program.

7. The method according to claim 6, further comprising:
   displaying the combined video image of the user and the objects of the foreground of the image formed by the computer to other users.

8. A system for creating video programs, primarily television programs, the system comprising:
   a video camera for shooting a participant of said video program;
   a means for generating an image including objects of a foreground and a background image;
   wherein said video camera and said means for generating said image being disposed in a studio;
   a means for displaying said objects of the foreground to the participant, said means for displaying being connected to said means for generating said image;
   a means for combining images;
   wherein said means for combining images includes a first input, wherein said first input is connected to an output of said video camera, a second input connected to an output of the means for generating said image; and
   wherein said means for combining images superimposes said image of the objects of the foreground on a video image of the participant.

9. The system according to claim 8, wherein said means for displaying provides an image displayed to the participant; and means for intersecting a line of shooting the participant with the video camera.

10. The system according to claim 9, wherein said means for displaying comprises:

a screen coupled to said means for generating said images and mounted outside a field of view of the video camera;

a semitransparent mirror, optically conjugated with said screen and mounted on the line of shooting the participant with the video camera at an angle to said line of shooting to generate a reflected image; and wherein said reflected image being displayed to the participant in a plane substantially perpendicular to the line of shooting.

11. The system according to claim 8, further comprising:

a means for interactive interaction of the participant with said image of the objects of the displayed objects; and wherein said means for interactive interaction being coupled to said means for generating said images.

12. The system according to claim 11, wherein said means for interactive interaction further comprises a means for determining a position and orientation of the participant.

13. The system according to claim 10, further comprises:

a channel of a telecommunication network;

a connection unit coupled by two-way communication to the channel of the telecommunication network, to said means for generating said images and to said means for combining said images;

at least one user device comprising:

a user means for generating said image of objects in the foreground and the background image;

a user connection unit coupled by two-way communication to the channel of the telecommunication network and to said user means for generating said images;

a user means for combining images of the foreground with said image of the participant of the video program sent over the channel of the telecommunication network by superimposing said image of the objects in the foreground on said image of the participant of the video program to obtain a combined image;

a user means for displaying said combined image;

wherein a first input of said user means for combining said images is connected to an output of said user connection unit;

a second input of said user means is connected to an output of said user means for generating said images; and an output of said user means is connected to an input of said user means for displaying said combined image.

14. The system according to claim 13, further comprising:

a user control unit;

wherein an output of said user control unit is connected to a corresponding input of the user connection unit and a user control command processing unit disposed in the studio; and wherein said user control unit is connected by two-way communication to the user connection unit and said means for generating said images.

15. A method for creating video programs in a video conference mode, said method comprising the steps of:

generating an image by a plurality of computers, wherein said image is associated with each of at least two spatially separated participants of said video program, said image including an image of objects of a foreground and a background image, wherein said plurality of computers are linked through a telecommunication network;

displaying at least said image of the foreground objects to each of said at least two participants of said video program;

providing a possibility of interacting with the displayed image of the foreground objects to change the displayed image of the foreground objects to each of said at least two participants of said video program;

shooting each of said at least two participants of the video program during each of said at least two participants interaction with at least said objects of the foreground to obtain a video image of each of said at least two participants;

transmitting said video image of each of said at least two participants through the telecommunication network;

obtaining a received video image of each of said at least two participants;

displaying said received video image corresponding to a first participant of said at least two participants to a second participant of said at least two participants;

displaying said received video image corresponding to said second participant of said at least two participants to said first participant of said at least two participants;

combining at said plurality of computers, the image of the foreground objects which are displayed to said first participant of said at least two participants with the received video image of said second participant of the at least two participants by superimposing said image of the foreground objects on said received video image of said second participant of the at least two participants to obtain a combined video image; and displaying said combined video image to each of said at least two participants of the video program.

16. The method according to claim 15, further comprising:

eliminating said background image with said background image formed by said plurality of computers or with any other image.

17. A method for creating video programs for registering reactions of a user to an image displayed to the user for studying and optimizing interfaces of computer programs and editing video films, said method comprising the steps of:

generating an image having transparent zones, wherein said generated image is formed by a computer;

displaying said generated image to the user;

shooting the user, wherein said shooting is performed in the course of displaying said generated image to the user with an aspect angle of said shooting, wherein said shooting provides a possibility to reproduce in an obtained video image said reaction of the user to said displayed image;

combining said generated image with said obtained video image of the user by superimposing said generated image having said transparent zones with said obtained video image of the user;

providing to said user a possibility to interact with said displayed generated image; and generating an output video signal from said obtained video image of the user and said generated image for subsequent analysis.

18. The method according to claim 17;

wherein said generated image comprises an image of objects and a background image; and wherein said background image is formed transparent when combined with said obtained video image of said user.

19. The method according to claim 18, further comprising:
   registering data of a psychophysiological condition of said user during said possibility of interaction with the displayed generated image.

20. The method according to claim 19, for comprising: combining indications of the registered data with images of the video program.

* * * * *